United States Patent

Liles et al.

Patent Number: 5,548,021
Date of Patent: Aug. 20, 1996

[54] TRIALKYL ENDCAPPED POLYORGANOSILOXANE EMULSIONS

[75] Inventors: Donald T. Liles; David L. Murray, both of Midland, Mich.

[73] Assignee: Dow Corning Corporation, Midland, Mich.

[21] Appl. No.: 330,403

[22] Filed: Oct. 28, 1994

[51] Int. Cl.$^6$ ............................ C08F 2/22; C08L 83/04
[52] U.S. Cl. .................... 524/837; 524/863; 524/801; 528/18
[58] Field of Search ................ 528/18; 524/801, 524/837, 863

[56] References Cited

U.S. PATENT DOCUMENTS

| | | | |
|---|---|---|---|
| 2,755,194 | 7/1956 | Volkmann et al. | 106/285 |
| 2,891,920 | 6/1959 | Hyde et al. | 260/29.2 |
| 3,294,725 | 12/1966 | Findlay et al. | 260/29.2 |
| 4,177,177 | 12/1979 | Vanderhoff et al. | 260/29.2 |
| 4,418,165 | 11/1983 | Polmanteer et al. | 523/212 |
| 4,618,642 | 10/1986 | Schoenherr | 524/425 |
| 4,678,835 | 7/1987 | Chang et al. | 528/17 |
| 4,743,474 | 5/1988 | Homan | 528/17 |
| 4,766,193 | 8/1988 | Nakasuji et al. | 528/17 |
| 4,782,112 | 11/1988 | Kondo et al. | 524/837 |
| 4,906,695 | 3/1990 | Blizzard et al. | 525/100 |
| 4,954,565 | 9/1990 | Liles | 524/860 |
| 5,034,455 | 7/1991 | Stein et al. | 524/788 |
| 5,064,894 | 11/1991 | Desmonceau et al. | 524/837 |

Primary Examiner—John C. Bleutge
Assistant Examiner—Karen A. Dean
Attorney, Agent, or Firm—Richard I. Gearhart

[57] ABSTRACT

A non-crosslinked endblocked polymer, comprising a preformed aqueous emulsion having a plurality of silanol-terminated polydiorganosiloxane particles, an endcapping silane having the formula $R_3SiX$ where X is a hydrolyzable group, R is an alkyl group consisting of 1 to 7 carbon atoms, and an organotin catalyst. The composition results in a non-crosslinked polymer, unlike the polymers described in the prior art. It has been found that adding an endblocking silane having only one hydrolyzable group to a preformed polydiorganosiloxane emulsion results in endblocked polydiorganosiloxane molecules free of crosslinks between the polydiorganosiloxane chains.

7 Claims, No Drawings

TRIALKYL ENDCAPPED POLYORGANOSILOXANE EMULSIONS

FIELD OF THE INVENTION

The invention relates to a method of end-capping a polydiorganosiloxane molecule in emulsion with a trialkyl functional silane, and the compositions resulting therefrom.

BACKGROUND OF THE INVENTION

Volkmann, et al. U.S. Pat. No. 2,755,194 teaches the preparation of polydiorganosiloxane emulsions by milling together a polyethylene glycol trimethylmonoether, and alkylaryl polyether sulfate sodium salt, water, and a siloxane polymer which can have various functionalities. This present invention does not teach an emulsification method but aims to teach a method to control the functionality of emulsion compositions.

Findlay and Weyenberg U.S. Pat. No. 3,294,725 teaches a stable polydiorganosiloxane emulsion prepared by polymerizing $R_nSiO_{(4-2)/2}$ or $HOR_2SiQSiR_2OH$ (where R is hydrogen hydrocarbon, or halohydrocarbon, n is preferably 2, and Q is a divalent hydrocarbon or ether containing hydrocarbon radical) in aqueous medium using a surface active sulfonic acid catalyst such as $C_{12}H_{25}C_6H_4SO_3H$. In particular, Example 3 of the '725 patent teaches the use of hexamethyldisiloxane to produce a trimethyl endcapped polymer. However, the '725 patent teaches only modification of the chain end during polymerization while the method of this invention teaches the post modification of a polydiorganosiloxane emulsion.

Schoenherr U.S. Pat. No. 4,618,642, teaches an aqueous silicone elastomeric emulsion that is obtained by mixing an anionic emulsion containing dispersed particles of hydroxyl endblocked polydiorganosiloxane, dialkyltindicarboxylate, silanes of the formula $RSi(OR')_3$ where R is a monovalent hydrocarbon radical of from 1 to 4 carbon atoms inclusive and R' is a lower alkyl radical of from 1 to 4 carbon atoms inclusive or a radical of the formula $-N=CR_2$ and inert, non-siliceous filler. Unlike the '642 patent, the present invention does not teach the use of $R'Si(OR')_3$ in the composition.

Kondo et al. U.S. Pat. No. 4,782,112 teaches a mixture of (A) a silicone water-based emulsion composed of water, emulsifying agent, and diorganopolysiloxane having at least 2 silicone-bonded hydroxyl groups in each molecule, (B) a silicone water-based emulsion composed of water, emulsifying agent, and organohydrogen-polysiloxane having at least 2 silicon-bonded hydrogen atoms in each molecule, and (C) a curing catalyst. It is characterized by an excellent storage stability, and by the formation on curing of a rubbery elastomeric coating film which has an excellent alkali resistance, water repellency, water-repellant sealability, and durability of adhesion. The '112 patent, however, does not teach the addition of a functionalizing silane to the polysiloxane as does the present invention.

Liles U.S. Pat. No. 4,954,565 teaches a shelf stable aqueous silicone emulsion which yields an elastomer upon removal of the water, produced by combining a hydroxy endblocked polydiorganosiloxane present as an emulsion of dispersed particles in water, a crosslinker, and a tin catalyst, the tin catalyst being in the form of a divalent tin atom combined with organic radicals. The emulsion, after crosslinking of the polydiorganosiloxane, can be reinforced with colloidal silica without affecting the shelf life of the reinforced emulsion. The '565 patent, however, differs from the present invention because the composition of the '565 patent does not include a monoalkoxy functionalizing silane. Moreover, the '565 patent does not teach adding monohydrolyzable silanes to silanol functional polymers to form non-crosslinked polymers.

SUMMARY OF THE INVENTION

The present invention relates to a non-crosslinked emulsion polymer having trialkylsiloxy end groups, comprising:

(A) a preformed aqueous polydiorganosiloxane emulsion comprising water, a surfactant, and a plurality of silanol-terminated polydiorganosiloxane molecules;

(B) an endblocking silane having the formula:

$$R_3SiX$$

where

X is a hydrolyzable group,

R is the same or different alkyl radical having from 1 to 7 carbon atoms inclusive; and (C) an organotin catalyst.

The reactants of (I) are allowed to react for sufficient time to form an end-blocked polymeric emulsion. The above described composition results in an endblocked emulsion polymer, unlike the emulsion polymers described in the prior art.

When the endblocking silane is added to the polydiorganosiloxane emulsion in the presence of an organotin catalyst an end-capped polymer results, consisting of a polydiorganosiloxane with a trialkylsiloxy endbocking group on each chain end. By "endblocking group" it is meant a non-reactive group that will not undergo further conventional chemical reactions.

The method of this present invention allows for specific placement of the endblocking silane at the chain end. This result is achieved by specifically selecting an endblocking silane having one hydrolyzable group and adding this silane after polymerization along with a tin catalyst. The endblocked polyorganosiloxane emulsions of the present invention have the physical characteristics of a gum or fluid, once the water is removed.

The resulting endblocked polydiorganosiloxane emulsion of the present invention can be used for slip additives, lubricants, antifoam additives, release agents and hydrophobing fabric treatments.

The polydiorganosiloxane emulsions of the present invention are in contrast to systems known in the prior art, in which the trialkyl functionality is attached to the chain end during polymerization. Systems in which the trialkyl functionality is attached on the chain end during polymerization do not easily produce high molecular weight polymers. The method of this invention differs from those of the prior art which employ a tin catalyst in that a trialkyl silane having a single hydrolyzable group is used in place of a crosslinking trialkoxy silane. If a trialkoxy silane is used, the resulting compositions consist of elastomeric polydiorganosiloxanes which upon removal of water produce elastomeric films that are in insoluble in solvent, whereas the present invention consists of non-crosslinked polydiorganosiloxane emulsions which form tacky gum-like or fluid-like films soluble in solvent when the water is removed.

DETAILED DESCRIPTION OF THE INVENTION

The present invention relates to a non-crosslinked endblocked emulsion polymer, comprising:

(A) a preformed aqueous polydiorganosiloxane emulsion comprising water, a surfactant, and a plurality of silanol-terminated polydiorganosiloxane molecules;

(B) an endblocking silane having the formula:

where X is a hydrolyzable group,
R is the same or different alkyl radical having 1 to 7 carbon atoms inclusive; and
(C) an organotin catalyst.

The aqueous emulsion having a plurality of particles of silanol-terminated polydiorganosiloxane is prepared by conventional methods well known in the art. In addition to the polydiorganosiloxane and water, this component also contains at least one surfactant which stabilizes the dispersed polydiorganosiloxane particles in the emulsion. The polydiorganosiloxane particles of this emulsion should have an average size of about 0.1 to about 10 microns, preferably from about 0.5 to about 1 microns. It is preferred that the above described emulsion have a solids content ranging from about 20 to about 70 weight percent, most preferably about 65 weight percent.

These emulsions are well known in the art and may be prepared, for example, by methods wherein cyclic or linear oligomeric diorganosiloxanes are dispersed in an aqueous continuous phase with the aid of the above mentioned surfactant and are thereafter emulsion polymerized by the introduction of an acid or base catalyst. These methods can be illustrated by the disclosures of among others, Findlay et al. U.S. Pat. No. 3,294,725 and Hyde et al. U.S. Pat. No. 2,891,920, which are hereby incorporate by reference. In preferred embodiments of the emulsion, the surfactant employed is an anionic type, such as sodium lauryl sulfate or ammonium lauryl sulfate, and the catalyst is dodecylbenzene sulfonic acid, the latter also acting as a surfactant in the system. The emulsions taught in Schoenherr U.S. Pat. No. 4,618,642 and Liles U.S. Pat. No. 4,954,565, may also be used in the present invention and these patents are hereby incorporated by reference. The hydroxyl terminated polydiorganosiloxane emulsion can also be prepared by direct emulsification. In this process, a mixture of water, polydiorganosiloxane and one or more surfactants is processed under high shear conditions using either conventional mixing equipment or high shear devices such as a homogenizer. Methods for preparing these polymer emulsions are given in Vanderhoff, et al. U.S. Pat. No. 4,177,177, which is hereby incorporated by reference.

The organic groups pendant from the backbone of the polydiorganosiloxane emulsion are independently selected from hydrocarbon or halogenated hydrocarbon radicals such as alkyl and substituted alkyl radicals containing from 1 to 20 carbon atoms; cycloalkyl radicals, such as cyclohexyl; and aromatic hydrocarbon radicals, such as phenyl, benzyl and tolyl. Preferred organic groups are lower alkyl radicals containing from 1 to 4 carbon atoms, phenyl, and halogen-substituted alkyl such as 3,3,3 -trifluoropropyl. Thus, the polydiorganosiloxane can be a homopolymer, a copolymer or a terpolymer containing such organic groups. Examples include systems comprising dimethylsiloxy units and phenylmethylsiloxy units; dimethylsiloxy units and diphenylsiloxy units; and dimethylsiloxy units, diphenylsiloxy units and phenylmethylsiloxy units, among others. Most preferably, the polydiorganosiloxane is a polydimethylsiloxane which is terminated with a hydroxyl group at each end of its molecule.

The endblocking silane is a silane having the following formula:

R is the same or different alkyl radical containing 1 to 7 carbon atoms inclusive. These groups are exemplified by methyl, ethyl, propyl, isopropyl, butyl, t-butyl, cyclohexyl, phenyl, hexyl or combinations thereof. The most preferred R radical is methyl.

X can be any hydrolyzable group. The term "hydrolyzable group" means any group attached to the silicon which is hydrolyzed by water at room temperature. The hydrolyzable group X includes hydrogen, halogen atoms such as F, Cl, Br or I; groups of the formula —OY when Y is any hydrocarbon or halogenated hydrocarbon group such as methyl, ethyl, isopropyl, octadecyl, allyl, hexenyl, cyclohexyl, phenyl, benzyl, beta-phenylethyl, any hydrocarbon ether radical such as 2-methoxyethyl, 2-ethoxyisopropyl, 2 -butoxyisobutyl, p-methoxyphenyl or —$(CH_2CH_2O)_2CH_3$; or any N,N-amino radical such as dimethylamino, diethylamino, ethylmethylamino, diphenylamino, or dicyclohexylamino. X Can also be any amino radical such as $NH_2$, dimethylamino, diethylamino, methylphenylamino or dicyclohexylamino; any ketoxime radical of the formula —ON=$CM_2$ or —ON=CM' in which M is any monovalent hydrocarbon or halogenated hydrocarbon radical such as those shown for Y above and M' is any divalent hydrocarbon radical both valences of which are attached to the carbon, such as hexylene, pentylene or octylene; ureido groups of the formula —N(M)CONM"$_2$ in which M is defined above hydrocarbon radical such as those shown for Y above and M" is H or any of the M radicals; carboxyl groups of the formula —OOCMM" in which M and M" are defined above or halogenated hydrocarbon radical as illustrated for Y above, or carboxylic amide radicals of the formula —NMC=O(M") in which M and M" are defined above. X can also be the sulfate group or sulfate ester groups of the formula —$OSO_2(OM)$ where M is defined above hydrocarbon or halogenated hydrocarbon radical illustrated for Y; the cyano group; the isocyanate group; and the phosphate group or phosphate ester groups of the formula —$OPO(OM)_2$ in which M is defined above.

The most preferred hydrolyzable groups of the invention are alkoxy groups. Illustrative examples of the alkoxy groups are methoxy, ethoxy, propoxy, butoxy, isobutoxy, pentoxy, hexoxy, 2 -ethylhexoxy, and the like; alkoxy radicals such as methoxymethoxy, ethoxymethoxy, and the like; and alkoxyaryloxy such as ethoxyphenoxy and the like. The most preferred alkoxy groups are methoxy or ethoxy.

The organotin catalyst (II) is an organic salt of tin and may be illustrated by tin (II) carboxylates, such as stannous oleate and stannous naphthanate; dialkyl tin (IV) carboxylates, such as dibutyltin diacetate and dibutyltin dilaurate; and tin (IV) stannoxanes, as exemplified by the structure $(Bu)_2SnCl$—O—$(Bu)_2OH$, in which Bu denotes a butyl radical, as taught by Stein et al. in U.S. Pat. No. 5,034,455. In preferred embodiments, the catalyst is stannous octoate.

To prepare the composition of the present invention, an organotin curing catalyst and an endblocking silane are added to the above described preformed aqueous polydiorganosiloxane emulsion. The endblocking silane migrates into the particles of the polyorganosiloxane where it condenses with the hydroxyl groups on the ends of the polydimethylsiloxane molecules in the presence of the organo tin catalyst. Unlike the other polyorganosiloxanes described above in the prior art, no crosslinking occurs between the polyorganosiloxane molecules in the present invention because the endblocking silane contains only one hydrolyzable group and therefore is incapable of crosslinking. This contrasts with the silanes taught in the prior art, in which the 3 or more hydrolyzable groups at the silicon atom of the silanes lead to a crosslinked polyorganosiloxane emulsion which has the physical characteristics of an elastomer upon the removal of water. The non-crosslinked polyorganosiloxane emulsions of the present invention therefore have the physical characteristics of a gum or fluid upon removal of water.

Although the order of addition is not considered critical, it is preferred to first add from about 0.05 to about 2 parts by weight, preferably from about 0.3 to about 0.6 parts, of the catalyst to 100 parts by weight of the hydroxyl-terminated polydiorganosiloxane in emulsion. From about 0.1 to about 10 parts by weight, preferably about 1 part, of the endblocking silane is then added to this mixture for each 100 parts by weight of the polydiorganosiloxane and the resultant emulsion is allowed to age. Usually the aging process requires from one half hour to four hours at room temperature. When the endblocking silane content is less than about 0.1 part, incomplete endcapping is observed; when this component exceeds about 10 parts, the by-products formed when the hydrolyzable group X is reacted can destabilize the emulsion. During the aging process, which can take place at room temperature as well as at elevated temperatures, the pH of the emulsion should be maintained between 4 and 10.5.

As will be recognized by one skilled in the art, a variety of fillers may be added to the composition to achieve desirable properties. As has been previously indicated, the silicone emulsion polymer of the present invention has a variety of end-uses, such as but not limited to slip additives, lubricants, antifoam additives, release agents, and hydrophobing gabric treatments.

EXAMPLES

The following examples are presented to further illustrate the compositions of this invention, but are not to be construed as limiting the invention, which is delineated in the appended claims. All parts and percentages in the examples are on a weight basis and all measurements were obtained at 25 degrees C., unless indicated to the contrary.

Example 1

A silanol functional polydimethylsiloxane emulsion was prepared by adding 4.0 g of sodium lauryl sulfate to 200 g of water followed by 200 g of a hydroxyl end-blocked polydimethylsiloxane fluid with an average degree of polymerization of approximately 50. The mixture was stirred for 15 minutes and the resulting dispersion was homogenized by passing it twice through a Microfluidics Microfluicizer at 8000 psi. The resulting emulsion contained 50 wt. % polydimethylsiloxane having an average particle size of 310 nm.

To 50 g of the above polydimethylsiloxane emulsion, 0.17 g of stannous octoate was added. The latex was stirred and 1.50 g of trimethylmethoxysilane was added dropwise. 1.5 g of the emulsion was inverted into tetrachloroethylene by adding the emulsion to a slurry of anhydrous ammonium sulfate in tetrachloroethylene. The silanol content of the polydimethylsiloxane by measuring the absorption of infrared light at 3693 cm$^{-1}$ using a Perkin Elmer Model 1640 FTIR. Another portion of the emulsion was inverted into toluene and the molecular weight was measured by Gel Permeation Chromatography (GPC). The endcapping efficiency, or the fraction of chain ends that were capped by the trimethylmethoxysilane, was determined by dividing the number of silanol chain ends determined by FTIR by the number of total chain ends calculated for the GPC molecular weight and subtracting this number from one.

After 16 hours, eighty five percent of the chain ends were capped with trimethyl groups and after 4 days ninety three percent of the chain ends were capped with trimethyl groups.

Example 2

An endcapping reaction was carried out in a similar fashion to Example 1 except 0.150 g of dibutyltin diacetate (DBTDA) was used in lieu of the stannous octoate.

The endcapping efficiency was then determined using the same FTIR technique described in Example 1. After 16 hours, seventy two percent of the polymer chain ends were capped with trimethyl groups and after 4 days 93 percent of the end groups were capped with trimethyl.

Example 3

An aqueous, anionically stabilized emulsion of hydroxyl ended PDMS having a solids content of approximately 62 percent by weight, a mean particle size of approximately 420 nm and a polymer weight average molecular weight of approximately 300,000 was prepared according to the method described by Schoenherr in U.S. Pat. No. 4,618,642. Next, 0.6 g of stannous octoate was added to the emulsion and stirred for 3 minutes. This was followed by 1.0 g of trimethylmethoxysilane which was added dropwise to the emulsion with continued stirring. After 10 minutes, the stirring was discontinued and the emulsion was allowed to remain undisturbed for an additionally hour.

The endcapping efficiency was then determined using the same FTIR technique described in Example 1. After 48 hours, 93 percent of the end groups were capped with trimethyl.

Example 4

An endcapping reaction was carried out in a similar fashion to Example 1 except 0.6 g of dibutyltin diacetate (DBTDA) was used in lieu of the stannous octoate.

The endcapping efficiency was then determined using the same FTIR technique described in Example 1. After 4 days, 100 percent of the end groups were capped with trimethyl.

The foregoing specification describes only the preferred embodiment and the alternate embodiments of the invention. Other embodiments may be articulated as well. It is expected that others will perceive differences which while differing from the foregoing, do not depart from the spirit and scope of the invention herein described and claimed.

That which is claimed is:

1. A non-crosslinked polymeric emulsion comprising:
   (A) a preformed aqueous polydiorganosiloxane emulsion comprising water, a surfactant, and a plurality of silanol-terminated polydiorganosiloxane molecules;
   (B) an endblocking silane having the formula:

R$_3$SiX where X is a hydrolyzable group,
   R is the same or different alkyl radical containing 1 to 7 carbon atoms inclusive; and
   (C) an organotin catalyst, whereby the resulting composition forms a non-crosslinked emulsion polymer.

2. The composition according to claim 1, wherein said polydiorganosiloxane is a polydimethylsiloxane which is terminated with silanol groups.

3. The composition according to claim 1, wherein said organo tin catalyst is selected from the group consisting of a tin (II) carboxylate and a dialkyl tin (IV) carboxylate.

4. The composition according to claim 3, wherein said organo tin catalyst is stannous octoate.

5. The composition according to claim 4 wherein said endblocking silane is trimethylmethoxy silane.

6. The composition according to claim 1, wherein the composition contains a filler.

7. The composition of claim 1, wherein the water has been removed.

* * * * *